United States Patent
Apostolopoulos et al.

(10) Patent No.: US 10,280,635 B1
(45) Date of Patent: May 7, 2019

(54) SHIELD (71) Applicant: Paul Kristen, Inc., Tonawanda, NY (US)

(72) Inventors: Paul Apostolopoulos, Clarence, NY (US); Davy E. Passucci, Clarence Center, NY (US)

(73) Assignee: Paul Kristen, Inc., Tonawanda, NY (US)

( * ) Notice: Subject to any disclaimer, the term of this patent is extended or adjusted under 35 U.S.C. 154(b) by 0 days.

(21) Appl. No.: 15/859,076

(22) Filed: Dec. 29, 2017

(51) Int. Cl.
| | |
|---|---|
| *E04B 2/00* | (2006.01) |
| *E04B 5/00* | (2006.01) |
| *E04B 9/00* | (2006.01) |
| *E04G 5/04* | (2006.01) |
| *E04G 5/14* | (2006.01) |
| *E04G 5/06* | (2006.01) |

(52) U.S. Cl.
CPC ............... *E04G 5/045* (2013.01); *E04G 5/06* (2013.01); *E04G 5/142* (2013.01)

(58) Field of Classification Search
CPC ........... E04G 5/045; E04G 5/06; E04G 5/142; E04G 3/30; E01D 19/106
See application file for complete search history.

(56) References Cited

U.S. PATENT DOCUMENTS

| | | | | |
|---|---|---|---|---|
| 1,658,670 | A * | 2/1928 | Corbett | E04G 3/30 182/223 |
| 3,760,550 | A | 9/1973 | Mueller et al. | |
| 3,920,221 | A * | 11/1975 | Berry | E04G 21/3223 256/59 |
| 4,620,612 | A * | 11/1986 | Enoki | B63C 5/02 182/113 |
| 4,821,844 | A * | 4/1989 | Huffman | E04G 5/06 182/186.9 |
| 5,730,248 | A * | 3/1998 | Apostolopoulos | E01D 19/106 182/138 |
| 5,957,239 | A * | 9/1999 | Marshak | E01D 19/106 182/150 |
| 6,161,807 | A | 12/2000 | Steiner et al. | |
| 6,386,319 | B2 * | 5/2002 | Apostolopoulos | E01D 19/106 182/138 |
| 6,634,152 | B1 | 10/2003 | Pilkinton | |
| 8,123,001 | B1 * | 2/2012 | Apostolopoulos | E01D 19/106 182/150 |
| 8,566,992 | B1 | 10/2013 | Stokes | |
| 2008/0302605 | A1 | 12/2008 | St-Germain et al. | |
| 2010/0258186 | A1 | 10/2010 | Harrenstien et al. | |
| 2014/0076370 | A1 | 3/2014 | De Villenfagne De Sorinnes et al. | |
| 2017/0096823 | A1 * | 4/2017 | Apostolopoulos | E01D 22/00 |

FOREIGN PATENT DOCUMENTS

RU 2194830 C2 12/2002

* cited by examiner

*Primary Examiner* — Brian D Mattei
(74) *Attorney, Agent, or Firm* — James C. Simmons (57) ABSTRACT

A temporary shield erected between two flanged structural members of a bridge or other structure, a kit therefor, and a method for erection of the shield. A plurality of length-adjustable beams have end portions which are rested on flanges respectively of the structural members. Decking is attached to the beams. At least one elongate member is cantileverly extended from at least one of the beams to underlie a structural member flange to prevent wind lift up of the shield.

14 Claims, 6 Drawing Sheets

Fig. 1

SHIELD

The present invention relates generally to structures used in the performance of work such as overhead concrete rehabilitation or steel rehabilitation on bridges and other structures. More particularly, the present invention relates to a canopy or barrier or shield which may be temporarily erected to prevent debris or items which may be dropped by workers from falling below a bridge structure being worked on by the workers, thus shielding motorists or people below from being hit by such falling debris or dropped items.

Applicant/assignee has for many years erected and provided kits for erecting platforms for use in performing painting and other work on bridges. Such platforms are illustrated in its U.S. Pat. Nos. 5,730,248; 5,921,346; 6,003,634; 6,135,240; 6,138,793; 6,227,331; 6,264,002; 6,302,237; 6,386,319; 6,523,644; 8,123,001; 9,217,451; 9,309,633; and 9,784,001; and U.S. published applications 2007/0096823 and 2017/0363135, all of which patents and published applications are incorporated herein by reference.

It is an object of the present invention to provide a sturdy shield which may be erected between a pair of I-beams to rest on flanges thereof.

It is another object of the present invention to provide a kit which is usable for erecting such a shield of various widths to correspond to the distance between the flanges.

In order to provide such a shield and such a kit therefor, in accordance with the present invention, a plurality of length-adjustable beams are laid so that their end portions rest on flanges respectively of a pair of structural members of a bridge or other structure, and decking is attached to the beams. Thus, the bridge's structural members serve to support the shield at the desired location, and the same beams may be used for different distances between the structural members.

The above and other objects, features, and advantages of the present invention will be apparent from the following detailed description of the preferred embodiment(s) thereof when read in conjunction with the appended drawings wherein the same reference numerals denote the same or similar parts throughout the several views.

DETAILED DESCRIPTION OF THE PREFERRED EMBODIMENT(S)

Figure 1:
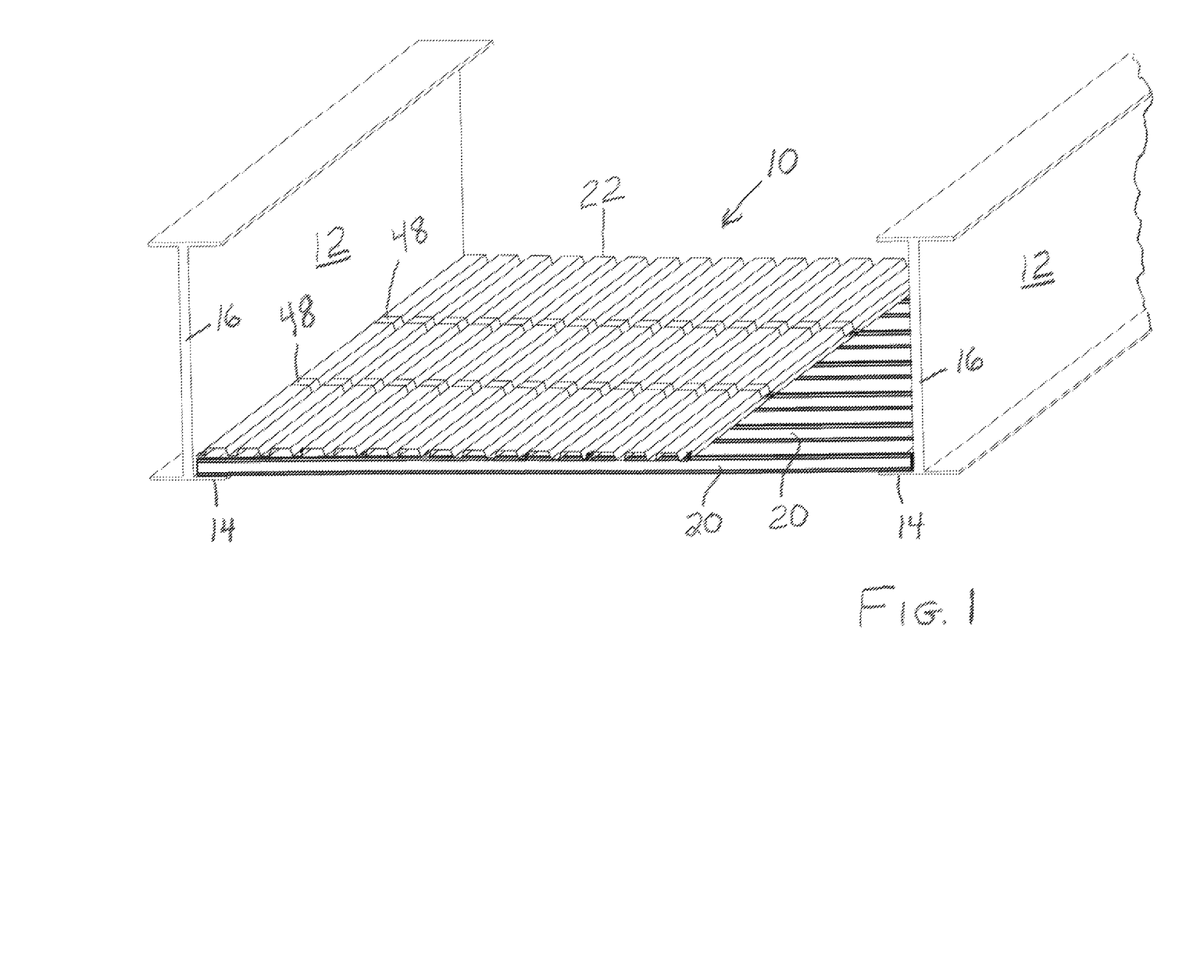
FIG. 1 is a partial perspective view of a barrier or canopy or shield partially erected between two structural members of a bridge or other structure.
Figure 2:
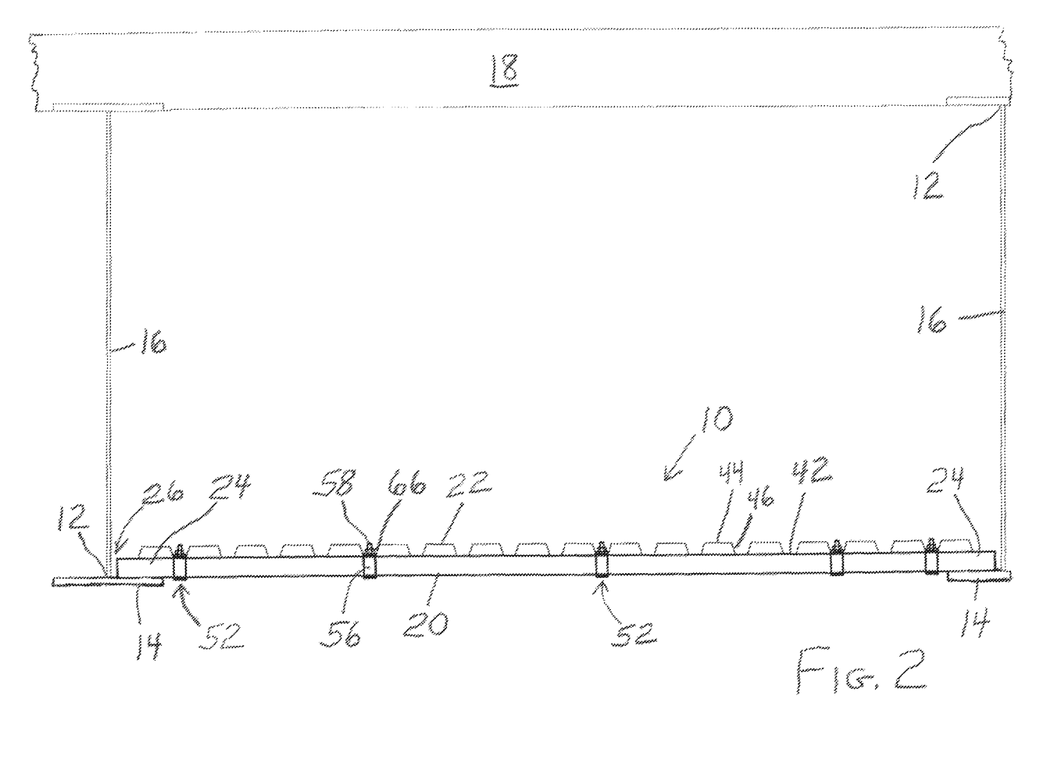
FIG. 2 is a edge view thereof.

Referring to FIGS. 1 and 2, there is shown generally at 10 a temporarily-erected shield or canopy or barrier whose function is to prevent the falling of debris or dropped items resulting from work on a bridge from falling onto motorists or persons below. The location of the shield may be selected to be between a pair of bridge I-beams 12 or other structural members which have flanges 14. Thus, the width of the shield 10 is substantially equal to the distance between the I-beam webs 16 so that the edges (width-wise) of the shield 10 may be firmly supported by respective flanges 14 of the I-beams 12. The I-beams 12 are in turn supported by a structural component 18 of the bridge. Work such as overhead concrete rehabilitation or steel rehabilitation and the like being performed on this structural component 18 is susceptible to the falling of debris or items dropped by workers onto traffic below, and a function of the shield is to shield against such felling of debris or objects onto traffic below. While the shield 10 is being described herein as being for a bridge, it should be understood that it will also be useful for use with other structures such as buildings.

The shield 10 comprises a plurality of spaced beams 20 to which decking 22 is attached. Each beam 20 is laid between the I-beams 12 so that their end portions 24 lie or rest on and are supported by respective flanges 14 thereof. Thus, the length of each of the beams 20 is substantially equal (with some small gap such as illustrated at 26 as desired for ease of erection) to the distance between the I-beam webs 16.

The distance between a pair of I-beams 12 will vary thus necessitating that the lengths of the beams 20 be selected to match. In order to avoid having to carry an inventory of beams of several different lengths, in accordance with the present invention, the beams 20 are length-adjustable. Thus, the same length-adjustable beams 20 may conveniently and inexpensively be used over and over for various shield widths to fit within the various distances between I-beams which may be found for bridges.

Figure 3:
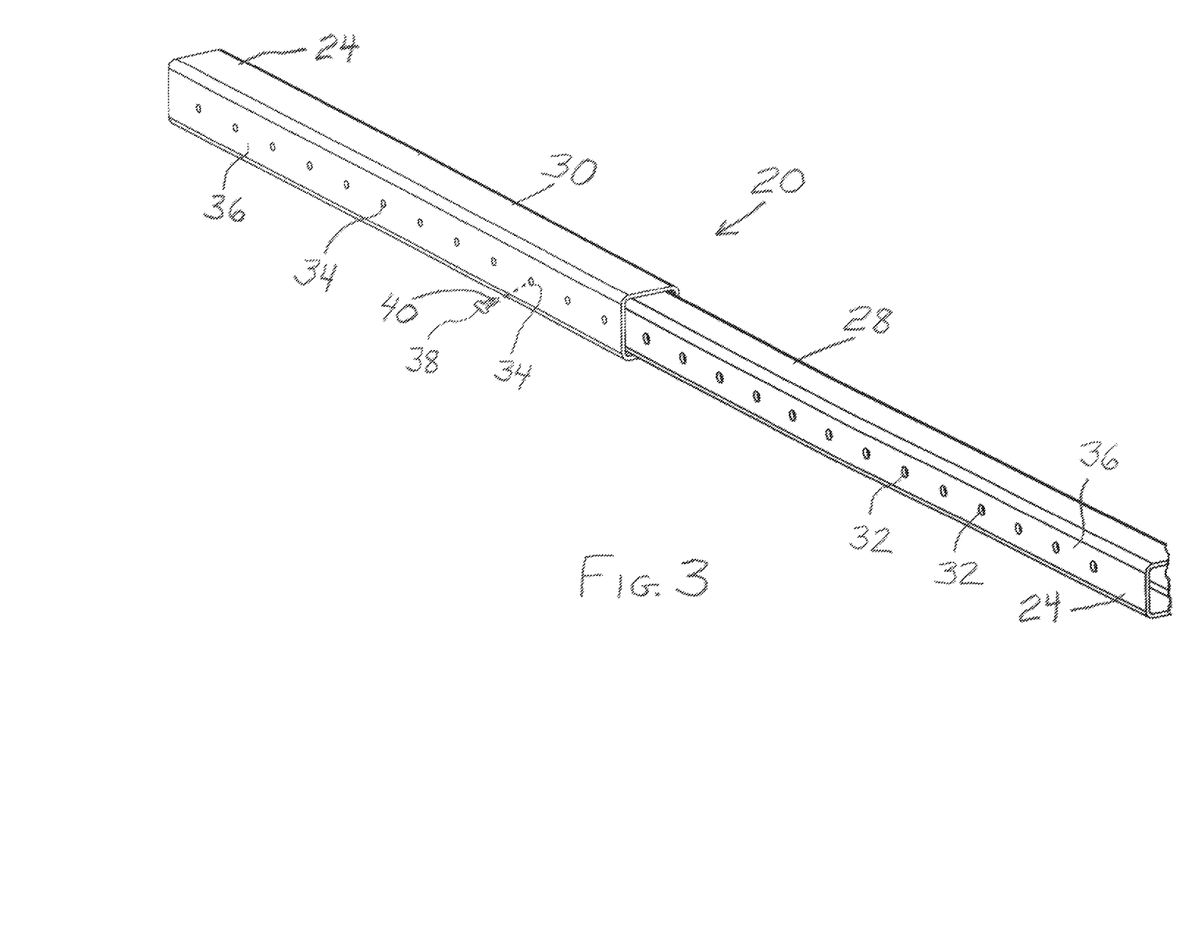
FIG. 3 is a perspective view of a beam therefor.

Referring to FIG. 3, there is illustrated one form of length-adjustable beam 20. The beam 20 comprises two tubular members 28 and 30 wherein one 28 is telescopingly received (snugly but not so tight as to interfere with telescoping movement) in the other 30 to vary or adjust the overall length of the beam 20. Preferably, the tubular members 28 and 30 are square-shaped in cross-section, but may otherwise be suitably shaped.

While the hereinafter described attachment of the decking 22 will hold the beam length, it may be desirable, such as during preparation of a number of the beams for placement, to maintain the adjusted length while the beams are being transported and placed. In order to do so, each of the tubular members 28 and 30 has a plurality of spaced apertures 32 and 34 respectively in one of its walls 36. The apertures 34 are threaded to threadedly receive screw 38. The apertures 32 are enlarged to receive (but not threadedly) the shank 40 of the screw 38 so as to temporarily retain the beam length during transport and installation. If desired, an other or other screws 38 may be used to even better hold the beam length.

The decking 22 is preferably corrugated sheet metal or otherwise suitably corrugated sheet, having alternately flats 42 and raised portions 44 separated by risers 46. Over the shield length, portions of the decking 22 are overlapped, as illustrated at 48. Over the shield width, portions of the decking 22 are also overlapped, by overlapping of a terminal flat 50 of one decking portion with a terminal flat 50 of another decking portion. The decking 22 is attached to the beams 20, by attachment mechanisms illustrated generally at 52, at terminal flats 50, but, as seen in FIG. 2, may be attached at others of the flats 42 and may not necessarily be attached at some terminal flats 50, as may be desired. Thus, as seen in FIG. 2, it may be awkward to attach the decking 22 at terminal flats 50 which are directly above the flanges 14.

Figure 4:
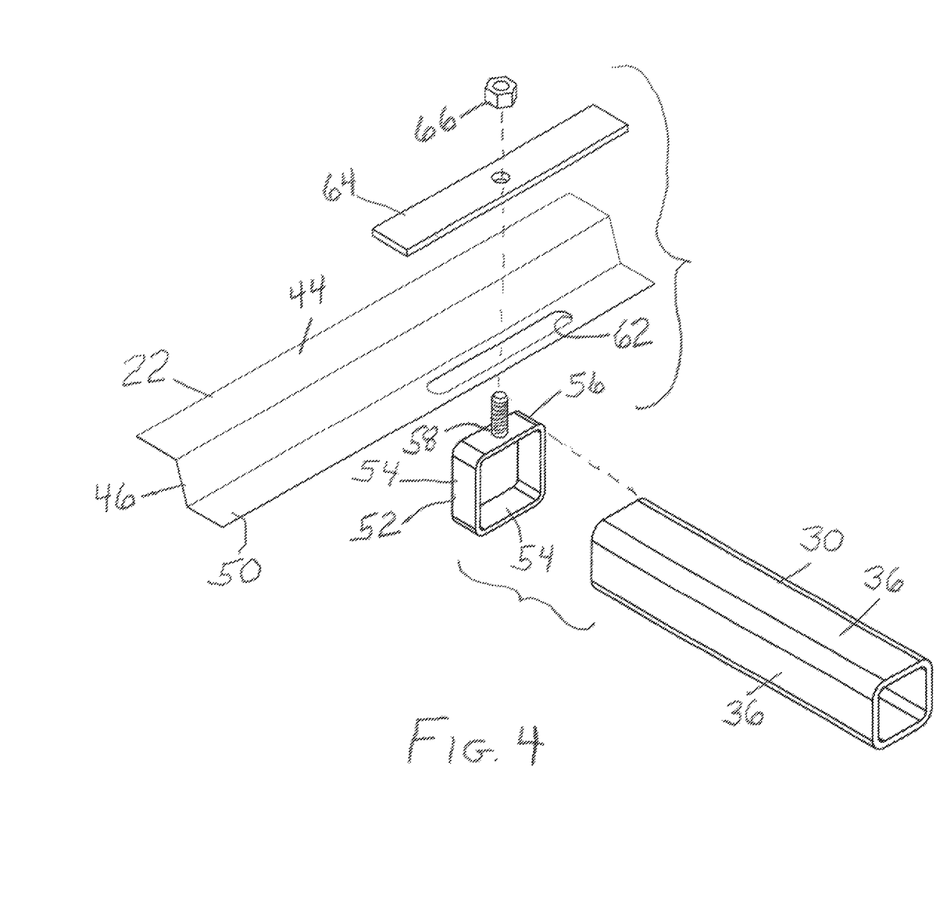
FIG. 4 is a perspective exploded view of a means for attachment of decking to the beams thereof.

Referring to FIG. 4, there is illustrated a portion of a tubular member 30 (but could also be tubular member 28), a portion of decking 22 to be attached thereto at a terminal flat 50 thereof, and an attachment mechanism 52. The attachment mechanism 52 includes a ring 56 that fits over the tubular member 30 (or tubular member 28) and has the same cross-sectional shape, i.e., for the preferred embodiment, square, having four flat walls 54 which engage the four walls 36 respectively of the respective tubular member with some snugness but not too tight. A threaded stud 58 is welded or otherwise suitably attached to one of the walls 54 of the ring 56 to project outwardly therefrom.

The terminal flat 50 has an oblong or elongate opening, illustrated at 62, for receiving the stud 58. The elongate nature of the opening 62 allows leeway in positioning the decking 22 for attachment to the beams 20. A flat elongate washer 64 is suitably sized to cover the elongate opening 62, and a nut 66 threadedly engages the threaded stud 58 to attach the decking 22 to the respective beam 20. The adjacent terminal flats 50 of a pair of adjacent decking portions are preferably overlapped and the stud 58 received in the elongate apertures 62 of both such adjacent terminal flats 50 for desirably laying the decking portions so that they overlap.

Figures 5, 6:
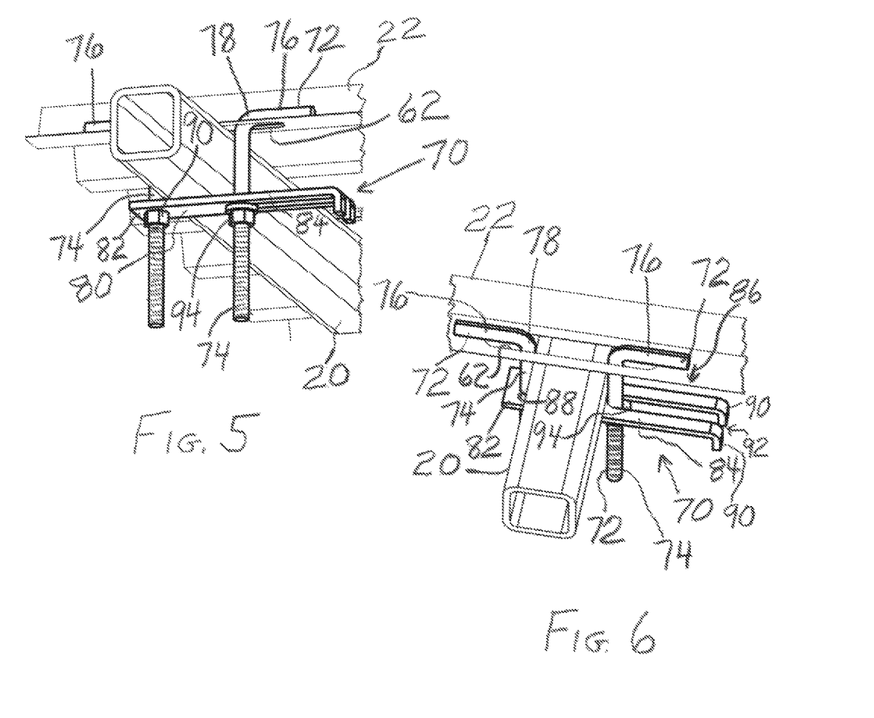
FIG. 5 is a perspective view, from below the shield, of an alternative means for attachment of decking.
FIG. 6 is a perspective view, above the shield, of the alternative means for attachment of decking.

As previously discussed, FIG. 4 illustrates one means for attaching decking sheet 22 to beams 20, wherein the attachments are made from above the sheet 22. It may sometimes be more desirable to make such attachments of the decking sheet 22 to beams 20 from underneath the decking 22 and beams 20. Referring to FIGS. 5 and 6, there is provided an alternative means for attaching decking sheet 22 to beams 20, wherein the attachments are made from underneath the beams 20 and sheet 22. The means for attaching comprises a plurality of clips one of which is illustrated generally at 70. The clip 70 includes a pair of brackets 72 having first elongate threaded portions 74 respectively which from above the decking 22 extend downwardly through the respective decking opening 62 and alongside and below opposite sides respectively of the respective beam 20. The brackets 70 further have second elongate portions 76 respectively which extend from upper ends, illustrated at 78, of the first elongate portions 74 respectively and which are normal to the first elongate portions 74 and which extend in directions away from the respective beam 20 and alongside said decking 22 and beyond ends respectively of the respective opening 62. Thus, as seen best in FIG. 6, the second elongate portions 76 are oriented to rest or lie on and bear downwardly on the decking 22, as illustrated by arrow 86. The elongate nature of the opening 62 allows the brackets 72 to be easily manipulated into position to be so oriented to rest or lie on the decking 22.

The clip 70 further includes an elongate plate 80 having first and second end portions 82 and 84 respectively and lying below the respective beam 20 and extending between the brackets 72. The first end portion 82 has an aperture, illustrated at 88, therein. One of the first elongate portions 74 is received in the aperture 88, and a nut 90 or other suitable fastener threadedly engages the respective first elongate portion 74 and urges the respective beam 20 against the decking 22. The second end portion 84 has a pair of prongs 90 defining a slot 92 there between. The slot 92 allows the respective bracket 72 to be easily manipulated into the orientation shown in FIGS. 5 and 6 after the other bracket has been oriented with regard to aperture 88. The other of the first elongate portions 74 is thus easily received in the slot 92, and a nut 94 or other suitable fastener threadedly engages this other first elongate portion 74 and also urges the respective beam 20 against the decking 22, with the second elongate portions 76 and the nuts 90 and 94 acting as a vice or clamp to securely attach the decking 22 to the beams 20.

Figure 7:
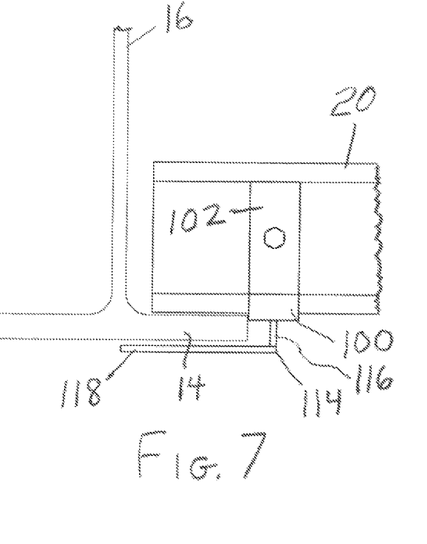
FIG. 7 is a side view of a clip, shown attaching one of the beams to one of the structural members to hold the shield down against wind up-lift.
Figure 8:
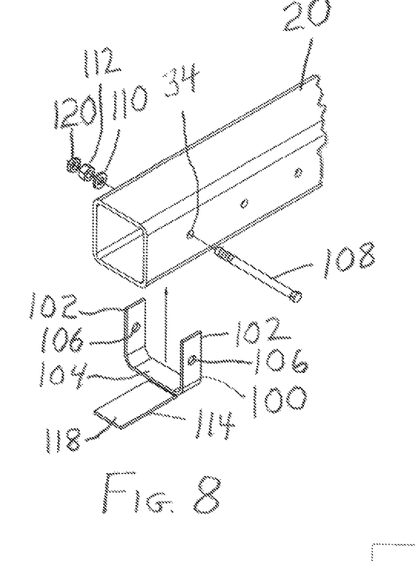
FIG. 8 is a perspective exploded view of the clip and showings its attachment to a beam.

Since, as so far described, the shield 10 rests on I-beam flanges 14, it may be susceptible to winds up-lifting the shield 10. Referring to FIGS. 7 and 8, there is shown a means for preventing this from occurring. Thus, each of a plurality of brackets 100 (preferably at least one on each side of the shield 10) is suitably shaped to the shape of the beam, i.e., for beam 20 being a square tube, the bracket 100 has two sides 102 joined by a third side 104 and may be formed by a strip of metal suitably bent or otherwise suitably formed. The bracket 100 is engaged to the beam 20 so that the two sides 102 engage the two sides respectively of the beam 20 and the bottom side 104 engages the bottom side of the beam 20. The two sides 102 have aligned apertures, illustrated at 106, which are alignable with a pair of aligned apertures 34 in the beam 20 which are adjacent its end. With the bracket 100 engaging the beam 20 and with the apertures 34 and 106 aligned, a bolt 108 is passed through the aligned apertures 34 and 106, a washer 110 applied, and a nut 112 and optional lock nut 114 applied to suitably secure the bracket 100 to the beam 20.

A plate weldment 114 is welded or otherwise suitably attached to the bracket third side 104. A first plate 116 of the plate weldment extends downwardly a distance equal approximately to or a little greater than the thickness of flange 14. A second plate 118 is welded to the first plate 116 so as to extend normal thereto and is seen to be cantilevered from the first plate 116. Thus, the second plate may be said to be cantilevered from the beam 20. If desired, a single plate may be bent to form the equivalent of the plate weldment 114. Thus, the plates 116 and 118 may be referred to herein and in the claims as plate portions. With the beam 20 resting on the flange 14, the second plate 118 extends from the bottom of the first plate 116 to underlie the flange 14 thus sandwiching the flange 14 between the beam 20 and the plate 118 to restrain upward movement of the shield 10 for the purpose of preventing or restraining up-lifting of the shield 10 by winds.

Since the same beams may be used over and over for various sites where the distance between the bridge I-beams will vary, the shield is suitable to be provided as a kit wherein it may be erected one day at one bridge and taken down and erected another day at another bridge. Beams of different lengths for the shield need not be maintained in inventory.

It should thus be understood that, while the present invention has been described in detail herein, the invention can be embodied otherwise without departing from the principles thereof, and such other embodiments are meant to come within the scope of the present invention as defined by the appended claims.

What is claimed is:

1. A shield erected between two flanged structural members, the shield comprising a plurality of length-adjustable beams having end portions which rest on flanges respectively of the structural members, and the shield further comprising decking attached to said beams, wherein said decking has a plurality of oblong openings therein, the shield further comprising a plurality of rings slipped onto said beams for attaching said decking to said beams, each said ring having a threaded stud extending from a wall thereof and received in a respective one of said openings, an elongate washer covering said respective opening, and a nut applied to said stud to attach said decking to said respective beam.

2. A shield according to claim 1 wherein at least one of said beams comprises two tubular members wherein one of said tubular members is telescopingly receivable in the other of said tubular members, whereby said one of said tubular members is slidable into and out of said other of said tubular members to adjust the length of said at least one beam.

3. A shield according to claim 2 further comprising a plurality of apertures in said one tubular member and spaced along the length thereof, a plurality of threaded apertures in said other tubular member and spaced along the length thereof, and at least one fastener threadedly received in one of said apertures of said other tubular member and received in one of said apertures of said one tubular member.

4. A shield according to claim 1 wherein said decking is corrugated sheet having flats including terminal flats, wherein said flats alternate with raised portions, wherein said openings are in said terminal flats.

5. A shield according to claim 1 wherein the structural members are structural members of a bridge.

6. A shield according to claim 1 further comprising means for holding the shield down to prevent wind up lift of the shield, said means for holding the shield down including at least one bracket attached to one of said beams, and a cantilevered arm extending from said bracket and underneath at least a portion of a flange of one of the structural members.

7. A shield erected between two flanged structural members, the shield comprising a plurality of length-adjustable beams having end portions which rest on flanges respectively of the structural members, and the shield further comprising decking attached to said beams, wherein said decking has a plurality of oblong openings therein, the shield further comprising means for attaching, from underneath said decking and said beams, said beams to said decking, wherein said means for attaching comprises at least one clip, said clip including a pair of brackets having first elongate threaded portions respectively which extend downwardly through a respective one of said decking openings and alongside and below opposite sides respectively of a respective one of said beams and further having second elongate portions respectively which extend from and normal to upper ends of said first elongate portions respectively and which extend in directions away from said respective beam and alongside said decking and beyond ends respectively of said respective opening to lie on said decking, said clip further including an elongate plate having first and second end portions and disposed below said respective beam and extending between said brackets, said first end portion having an aperture therein, one of said first elongate portions received in said aperture, and a fastener threadedly engaging said one of said first elongate portions and urging said respective beam against said decking, and said second end portion having a pair of prongs defining a slot there between, an other of said first elongate portions received in said slot, and a fastener threadedly engaging said other of said first elongate portions and urging said respective beam against said decking.

8. A kit for erecting a shield, the kit comprising a plurality of beams which are length-adjustable to fit a distance between two flanged structural members so that end portions of each of said beams rest on flanges respectively of the structural members, decking, and fasteners for attaching said decking to said beams, wherein said decking is corrugated sheet and has a plurality of oblong openings therein, the kit further comprising a plurality of rings shaped to be slipped onto said beams for attaching said decking to said beams, each said ring having a threaded stud extending from a wall thereof and receivable in a respective one of said openings, and the kit further comprising elongate washers for covering the oblong openings respectively in said decking and nuts for application to said studs to attach said decking to said beams.

9. A kit according to claim 8 wherein said decking has a plurality of oblong openings therein and wherein said fasteners comprise at least one clip, said clip including a pair of brackets having first elongate threaded portions respectively for extending from above said decking downwardly through and from one of said decking openings and alongside and below opposite sides respectively of said respective beam and further having second elongate portions respectively which extend normal to upper ends of said first elongate portions respectively for extending in a direction away from said one of said beams and alongside said decking and beyond ends respectively of said respective opening, said clip further including an elongate plate having first and second end portions and for being disposed below said respective beam and extending between said brackets, said first end portion having an aperture therein, one of said first elongate portions receivable in said aperture, and a fastener for threadedly engaging said one of said first elongate portions and for urging said respective beam against said decking, and said second end portion having a pair of prongs defining a slot there between, an other of said first elongate portions receivable in said slot, and a fastener for threadedly engaging said other of said first elongate portions for urging said respective beam against said decking.

10. A kit according to claim 8 wherein each of said beams comprises two tubular members wherein one of said tubular members is telescopingly receivable in the other of said tubular members, whereby said one of said tubular members is slidable into and out of said other of said tubular members to adjust the length of said beam.

11. A kit according to claim 10 further comprising a plurality of apertures in said one tubular member and spaced along the length thereof, a plurality of threaded apertures in said other tubular member and spaced along the length thereof, and at least one fastener threadedly received in one of said apertures of said other tubular member and received in one of said apertures of said one tubular member.

12. A kit according to claim 8 further comprising means for holding the shield down to prevent wind up lift of the shield, said means for holding the shield down including at least one bracket attachable to one of said beams, and a cantilevered arm extending from said bracket to be positioned to lie underneath at least a portion of a flange of one of the structural members.

13. A kit according to claim 8 wherein said decking is corrugated sheet.

14. A method for erecting a shield comprising the steps of adjusting the lengths of a plurality of beams so that end portions of each of the beams rest on flanges of two spaced structural members respectively, placing the beams between the structural members so that the end portions of each of the beams rest on the flanges respectively, and attaching decking to the beams, wherein the step of attaching the decking comprises inserting, from underneath said decking and said beams, a pair of brackets in at least one oblong hole in the decking to bear on the decking and to extend downwardly therefrom along sides of a respective beam, and attaching, from underneath said decking and said beams, an elongate plate to the brackets so that it bears against the respective beam.

* * * * *